A. H. IHSEN.
LATHE TOOL.
APPLICATION FILED JULY 18, 1910.

987,233.

Patented Mar. 21, 1911.

WITNESSES.

INVENTOR.

UNITED STATES PATENT OFFICE.

ARTHUR H. IHSEN, OF PITTSBURG, PENNSYLVANIA, ASSIGNOR OF ONE-HALF TO HENRY L. IHSEN, OF PITTSBURG, PENNSYLVANIA.

LATHE-TOOL.

987,233.  Specification of Letters Patent.  Patented Mar. 21, 1911.

Application filed July 18, 1910. Serial No. 572,502.

*To all whom it may concern:*

Be it known that I, ARTHUR H. IHSEN, a resident of Pittsburg, in the county of Allegheny and State of Pennsylvania, have invented a new and useful Improvement in Lathe-Tools; and I do hereby declare the following to be a full, clear, and exact description thereof.

My invention relates to devices for carrying the cutting tool used in lathes or like machines. Its object is to provide an improved tool holder and tool adapted for use therewith which can be attached to the ordinary lathe carriage, and by which a cut can be made in the work much closer to the chuck or face plate than has been heretofore possible.

In all types of tool holders in use, so far as I know, the tool or blade is carried at or near the center of the tool holder, and it is therefore impossible to bring the cutting edge any closer to the work than half the width of the tool holder at least. By my invention, I provide an improved tool gripping device constructed on a different principle which is, nevertheless, adapted for use with the ordinary lathe carriage, and by which the cut can be brought much closer to the chuck face.

While my invention is shown and described in connection with a cutting off tool, it will be understood that the advantages and convenience in use are also of value in connection with an ordinary trimming tool or for all other machining purposes of this nature.

To these ends my invention consists, generally stated, in a device of the character described provided with means for attachment to the lathe carriage and having means for carrying the tool at the extreme side of the device.

It also consists preferably in a tool holder having a body portion and a jaw portion movable relatively thereto and provided with means for gripping the tool and holding it at one side of said body portion.

It also consists in certain other improvements and features of construction, as hereinafter more particularly pointed out and claimed.

Figure 1:
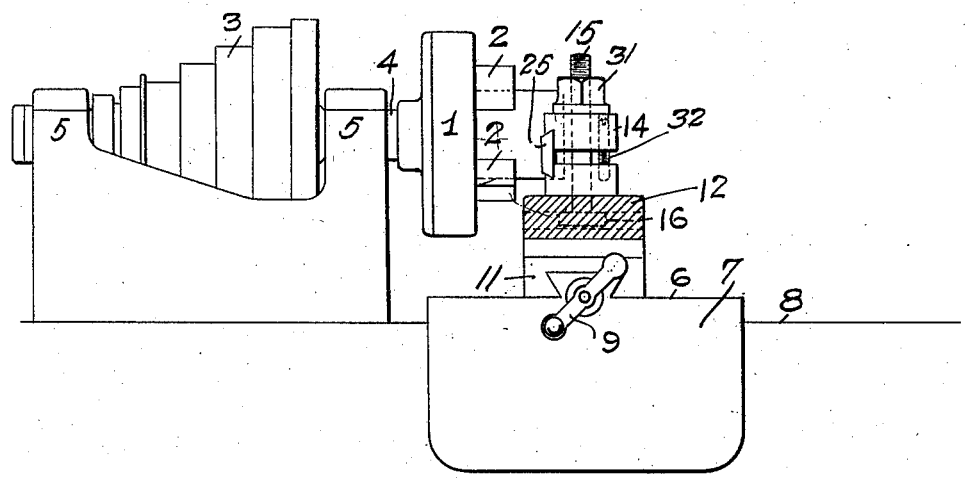
Figures 2, 3, 4:
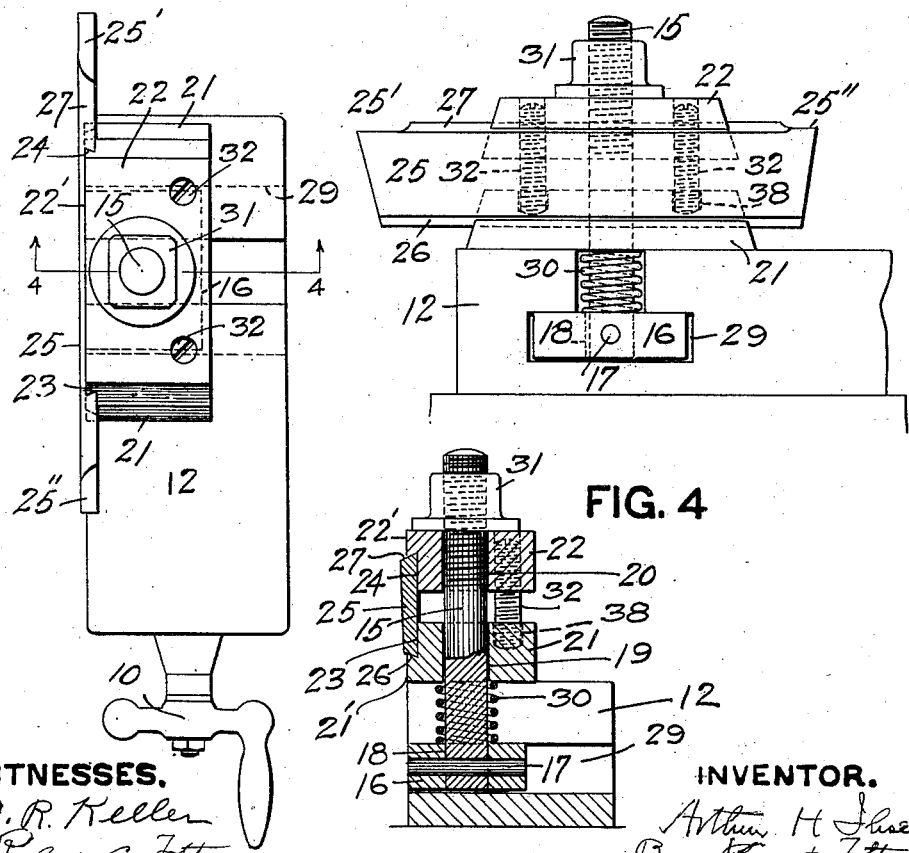

In the drawing, Figure 1 is a diagrammatic side view of a portion of a lathe illustrating my invention as applied thereto. Fig. 2 is a top plan view of the device illustrated in Fig. 1. Fig. 3 is a side view of the same; and Fig. 4 is a vertical section of the same on the line 4—4 Fig. 2.

The lathe shown in Fig. 1 is provided with the ordinary chuck or face plate 1 having the jaws 2 and adapted to be actuated through the driving pulleys 3 carried by the shaft 4 journaled in the bearings 5. The carriage 6 is illustrated as of a simple non-power driven type having the apron portion 7 adapted to traverse the bed 8 of the lathe and adjusting screws indicated at 8 and 10 respectively for adjusting the blocks 11 and 12 transversely and longitudinally relative to the apron 7.

The tool holder 14 of my invention is preferably provided with a pivoted T-bolt 15, the head 16 of which is carried on the pivot 17 journaled in the slot 18 of the bolt 15. The bolt 15 extends through the holes 19 and 20 in the lower jaw or body portion 21 and upper jaw 22 respectively. The lower jaw or body portion 21 is provided at its side 21′ with the dove-tailed slot or kerf 23 and the movable upper jaw 22 is provided at its corresponding side 22′ with a like dove-tailed slot or kerf 24. The tool 25 used is provided with the beveled or feathered edges 26 and 27 adapted to take a mating fit within the slots 23 and 24 respectively. The device is thus adjustable, and can be used with various sizes and types of tool, so long as the tool used is equipped with a beveled or feathered edge to fit within the feathered slot or dove-tail provided in the side of the tool body portion or gripping jaw. By providing a sufficient inwardly flaring bevel in the tool edges and slots I am enabled to provide a secure grip of the tool without having the sides 21′ and 22′ extend beyond the outside of the blade or tool 25, they in practice extending outwardly to less than the entire width thereof.

I have referred to the member 21 as a body portion or jaw for the reason that it is apparent that my broad invention is not limited to a jaw 21 movable relatively to the bolt 15, although I prefer to employ a device of this nature, as it affords a very efficient means of adjustably fastening the head 16 of the bolt 15 within the T-slots 29 of the lathe carriage. The pivoted head 16 affords a permanent close grip within the block 12 of the lathe carriage, as the unequal wear caused by heavy pressure, rough handling or the like is taken up by the adjustment at the pivot 17. The spring 30 serves to maintain the jaws 21 and 22 in engagement with the tool 25 until the nut 31 has been tightened on the bolt 15 to grip the tool in working position. The jaw 22 is preferably provided with the dowel pins 32, illustrated as adjustable set screws, which fit within the holes 38 in the jaw or body portion 21. The dowel pins 32 are in practice maintained of proper adjusted length to correspond to the width of tool employed, so that when the nut 31 is tightened to grip the tool the dowel pins 32 bear against the body portion 21 and prevent any tendency to bend or buckle the tool which is carried at the extreme opposite side of the jaw 22 and body portion 21.

In the embodiment illustrated the tool 25 is inserted after the tool holder 14 has been adjusted in correct position on the carriage and is gripped in position through the influence of the spring 30 so that the tool can be accurately adjusted to the required cutting position. The nut 31 is then tightened thereby both securely gripping the tool within the tool holder and firmly fastening the tool holder in position on the lathe carriage.

It will be apparent from Fig. 1 to all persons skilled in the art that the tool 25 can be advanced to practically the end of the jaws 2 of the chuck 1, as the top portion or block 12 of the carriage 6 is eccentric to the axis of the lathe and does not abut against the lathe chuck 1. This feature is of great advantage in cutting off tools, as it saves waste of material and aids in convenience of operation. The tool may be used either as a straight or right or left hand offset cutting off tool. In all cases the direct pivot grip afforded by my invention with the sidewise position of the tool render buckling or breaking off thereof much less likely than where bent tools or like expedients are employed to bring the cutting edge close to the chuck face. A tool of the double edge or ended type illustrated having the cutting edges 25′ and 25″, can also be conveniently employed, and either edge used without removing the tool by merely reversing or adjusting the position of the tool holder.

What I claim is:

1. A device of the character specified comprising two relatively movable jaws provided with means for carrying a tool at their side, a bolt extending centrally through one of said jaws and adapted to grip the same to fasten the tool, a dowel pin carried on the opposite side of said bolt to the tool, and a spring operative on said jaws to effect a preliminary grip of the tool before it is fastened by the bolt.

2. A device of the character specified comprising in combination with a lathe carriage provided with a T-slot, two movable jaws above the same, adapted to grip a tool and having vertically extending slots, a bolt extending through all of said slots and having a head within said T-slot and a spring around said bolt between the lower of said jaws and said head.

3. A device of the character specified, comprising movable jaws provided with means for carrying a tool, a lathe carriage, a bolt extending through said jaws and into the lathe carriage and having means for relatively moving said jaws to grip the tool and a spring operative on the lower of said jaws to effect a preliminary grip of the tool before the bolt is tightened.

4. A device of the character specified, comprising two movable jaws the lower of which is supported on the lathe carriage, and provided with means for holding a tool, a bolt extending through said jaws and provided with means for contracting the same to fasten the tool and secure the jaws in position on the carriage and a spring operative on one of said jaws to effect a preliminary gripping of the tool before the bolt is tightened.

5. A device of the character specified comprising in combination with a carriage provided with a T-slot, two movable jaws adapted to carry the tool, a T-bolt extending through the same and having a head within said T-slot pivoted to its shank and a spring around said shank and operative on the lower of said jaws.

6. A device of the character specified comprising in combination with a carriage, means for gripping and holding the tool including a bolt, a head pivoted thereto and carried within said carriage and a spring operative on said head.

In testimony whereof, I the said ARTHUR H. IHSEN have hereunto set my hand.

ARTHUR H. IHSEN.

Witnesses:
ROBERT C. TOTTEN,
JOHN F. WILL.

---

Copies of this patent may be obtained for five cents each, by addressing the "Commissioner of Patents, Washington, D. C."